(No Model.) 2 Sheets—Sheet 1.
E. P. PASQUIER.
ROLL HOLDING CAMERA.
No. 597,857. Patented Jan. 25, 1898.
FIG. 1.
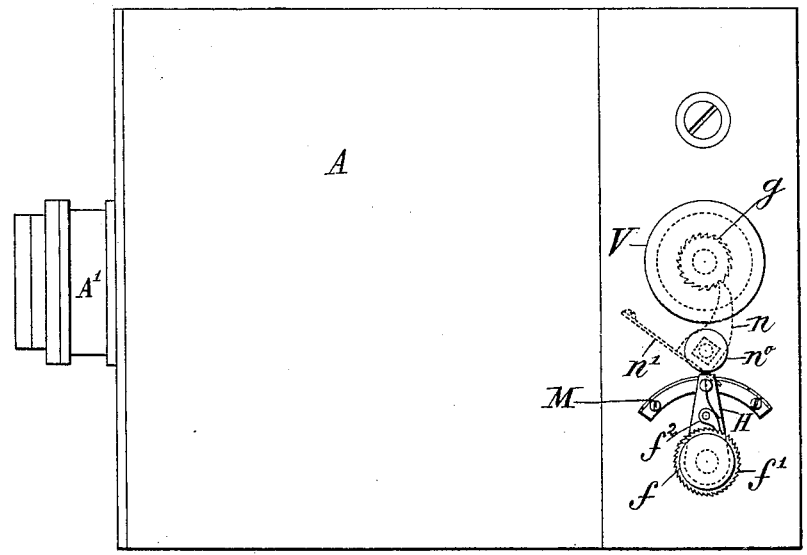
FIG. 2.
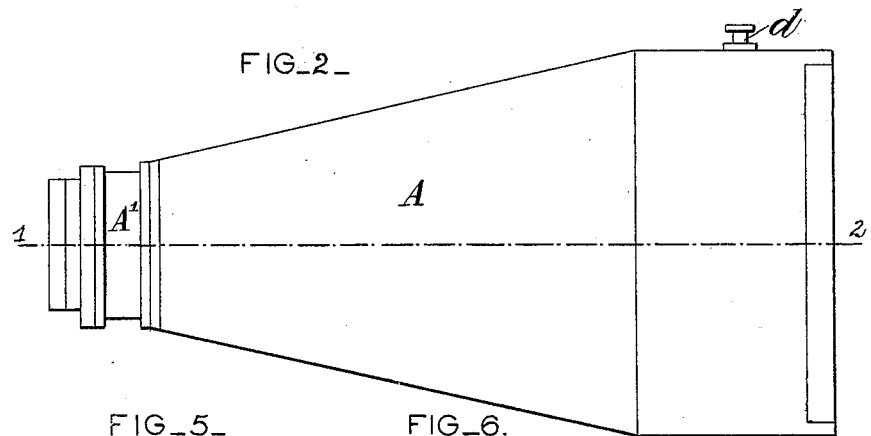
FIG. 5. FIG. 6.
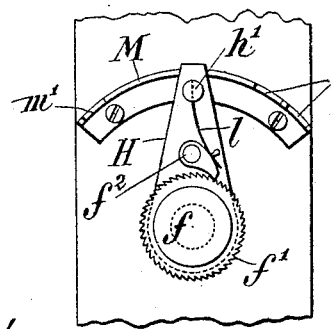 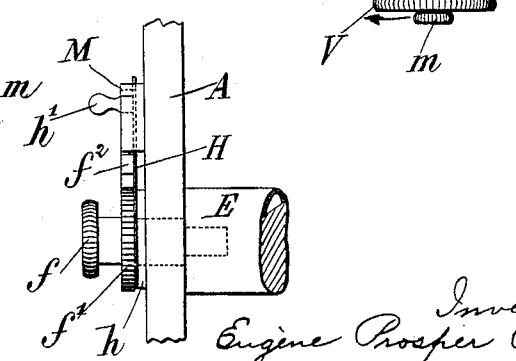
Witnesses:
W. C. Pinckney
C. Holloway
Inventor:
Eugène Prosper Pasquier
By J. E. M. Dowen
Attorney (No Model.) 2 Sheets—Sheet 2.
E. P. PASQUIER.
ROLL HOLDING CAMERA.
No. 597,857. Patented Jan. 25, 1898.
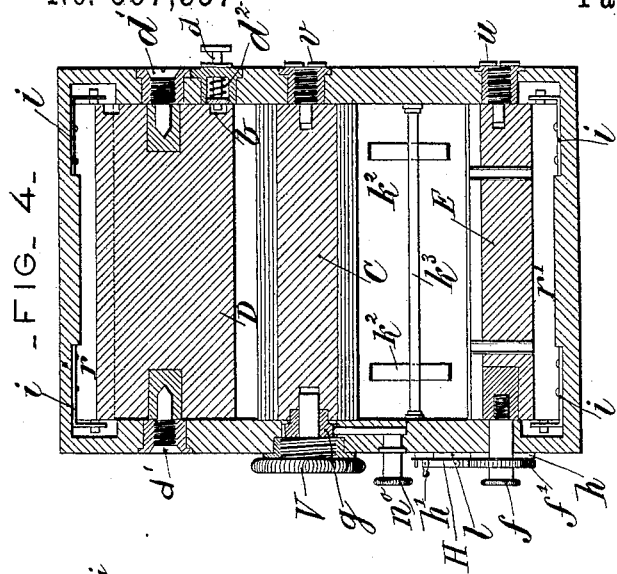
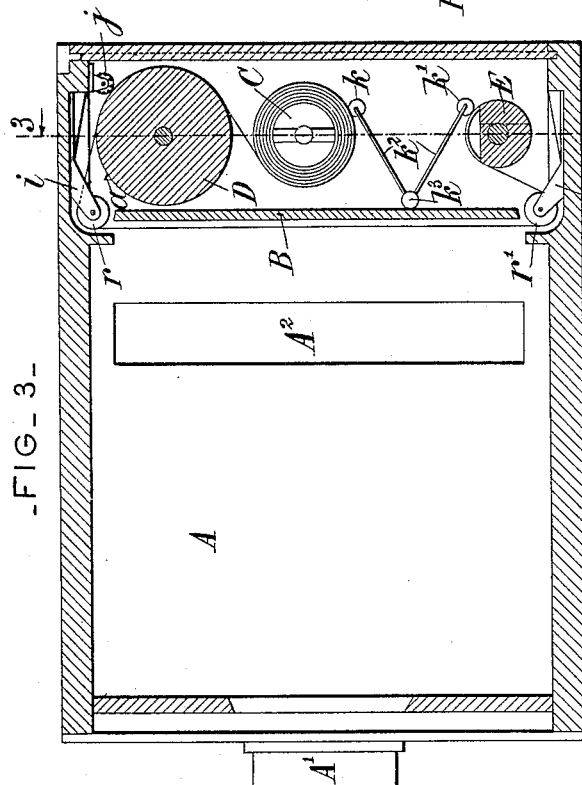
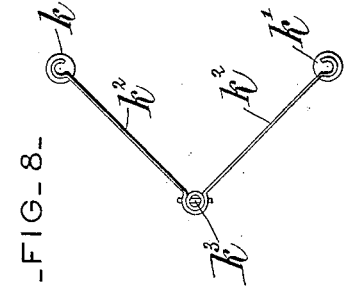
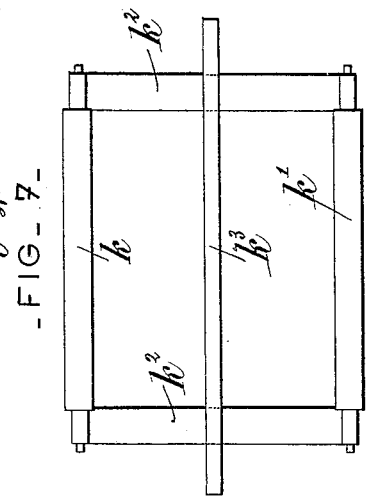
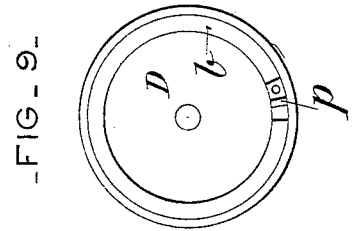
Witnesses:
W. C. Pinckney
C. Holloway
Inventor:
Eugène Prosper Pasquier
By J.E.M. Bowen
Attorney.

United States Patent Office.

EUGÈNE PROSPER PASQUIER, OF PARIS, FRANCE.

ROLL-HOLDING CAMERA.

SPECIFICATION forming part of Letters Patent No. 597,857, dated January 25, 1898.

Application filed July 9, 1897. Serial No. 643,974. (No model.) Patented in France January 23, 1897, No. 263,353.

*To all whom it may concern:*

Be it known that I, EUGÈNE PROSPER PASQUIER, a citizen of the Republic of France, residing at Paris, France, have invented certain new and useful Improvements in or Relating to Photographic Cameras, (for which I have obtained Letters Patent in France, No. 263,353, dated January 23, 1897,) of which the following is a specification.

This invention relates to a photographic camera in which a sensitized film is employed and in which a perfect tension of the film is attained by means of a simple device which can be easily adapted to all apparatus of this kind. With this device the portion of sensitive film to be exposed to light is perfectly flat and its winding and putting in place can be effected very easily.

In the accompanying drawings, Figure 1 is an elevation of a camera provided with a film-tension device according to the present invention. Fig. 2 is a plan corresponding to Fig. 1. Fig. 3 is a longitudinal section on the line 1 2 of Fig. 2. Fig. 4 is a cross-section on the line 3 4 of Fig. 3. Figs. 5 and 6 are respectively a front and side view of the tension device. Figs. 7 and 8 are respectively a front and side view of the compensating spring, and Fig. 9 is an end view of the indicating-roller.

The apparatus comprises a dark chamber A, provided with an objective A', as usual, and it is provided with a window $A^2$, which can be closed by a cover. Toward the back is a partition B, forming a compartment in which are arranged five rollers or spools—viz., a carrying-spool C, an indicating-roller D, provided with points $a$ on one of its edges, a receiving-spool E, provided with means for holding the ends of the film, and, finally, two guide and tension rollers $r$ $r'$, arranged at the top and bottom of the partition B and mounted on elastic supports $i$ $i$.

The spindle of the carrying-spool C is provided on the outside with a ratchet-wheel $g$, engaging with a pawl $n$, mounted on a knob $n^0$, and having a square head on which presses a spring $n'$, tending to hold said pawl in or out of engagement with the ratchet-wheel $g$, according to circumstances. Said spool C is supported by cylindrical portions of two screws V and $v$, arranged in the walls of the chamber or casing A.

The indicating-roller D rotates on the points of two screws $d'$ $d'$, and near and parallel to it is arranged a fluted roller $j$. At one of its ends the roller D is provided with a circular groove $b$, Fig. 9, having a stop $p$ and a knob $d$, Fig. 4, on which acts a helical spring $d^2$, tending to force it against the bottom of the groove $b$.

The receiving-spool E is supported at one of its ends by a screw $u$, on which it can freely turn. At the other end it is mounted on a spindle $f$, by means of which it is operated. This spindle $f$ carries a ratchet-wheel $f'$, engaging with a pawl $f^2$, mounted on a spring plate or lever H, provided with a socket $h$, which can freely turn on the part $f$. A spring-blade $l$ constantly holds the pawl $f^2$ in engagement with the ratchet-wheel $f'$ and is fixed to a knob $h'$, which facilitates the handling of the device. The end of the lever H can move in front of a sector M, secured to the casing of the apparatus and provided at each end with notches $m$ $m'$.

The compartment at the back of the camera contains, moreover, a pressure-compensating device consisting of two rollers $k$ $k'$, which respectively press against the sensitive film wound on the spool C and against the impressed portion of the same film wound on the receiving-spool E. These rollers $k$ $k'$ are mounted on elastic blades or arms $k^2$ $k^2$, arranged on a spindle $k^3$, and constantly pressing the rollers against the spools C and E in order to maintain there a pressure opposing the unwinding of the wound-up film.

Working: In order to put the sensitive film in place, the back $A^3$ of the dark chamber A is removed, as well as the screws V and $v$. The carrying-spool C, carrying a length of film wound on it, is then introduced. The ratchet-wheel is adjusted in the spool C and then the screws V and $v$ replaced, and the compensating device, with its rollers $k$ $k'$, is arranged in place. The film is passed over the rollers D, $r$, and $r'$ by causing it to pass over the partition B and by holding it with one hand passed through the opening $A^2$. The end of the film is then secured to the spool E by means of pincers or otherwise with which the latter is provided. In order to stretch the film, the pawl $n$ is disengaged from the ratchet $g$ by turning the knob $n^0$, and the screw V is turned in the direction indicated by the arrow F in order to wind up the portion which is not taut on the spool C till the springs $i\,i$ are sufficiently stretched, when the parts are replaced and the apparatus is ready for work. When the portion of the film before the partition B has received an impression, it must be replaced by a new section of sensitive surface. For this purpose the lever H, which was previously engaged with one of the notches $m$, is brought into the notch $m'$, so as to slacken the film and the springs $i\,i$. The knob $d$ is disengaged from the groove $b$ by raising it, and the spindle $f$ is then turned in order to wind up on the spool E the impressed part, and the lever H is brought back into one of the notches $m'$ of the sector M. When the knob $d$ engages with the stop $p$, the desired length of film has been unwound. During the movement of the lever H the pawl $f^2$ causes the ratchet-wheel $f'$ and the spindle $f$ to participate in its movement, which causes a partial rotation of the spool E and stretches the film and the springs $i\,i$ to the desired extent. The points $a$ leave on the film-ribbon impressions dividing the separate photographs, which may be severed at places thus marked.

I claim—

1. In a sensitized-film photographic camera a device for supporting the sensitive film, characterized by the combination in a compartment at the back of the apparatus of five rollers, namely, a film-carrying roller, an indicating-roller provided with points $a$, a receiving-spool with means for engaging the end of the film and two guide-rollers $r\,r'$, spring-supports $i\,i'$ on which said guide-rollers are mounted, with devices for regulating the tension and pressure on the film, substantially as described.

2. In a photographic camera, the combination with a receiving-spool, of a knob $f$, ratchet-wheel $f'$, spring-lever H loose on knob $f$, pawl $f^2$ mounted on said spring-lever, and a sector M provided with suitable catches, substantially as set forth.

Signed at Paris this 26th day of June, 1897.

EUGÈNE PROSPER PASQUIER.

Witnesses:
ABEL JULIEN,
EDWARD P. MACLEAN.